United States Patent
Pearson et al.

(10) Patent No.: US 10,895,016 B2
(45) Date of Patent: Jan. 19, 2021

(54) ELECTROLYTIC GENERATION OF MANGANESE (III) IONS IN STRONG SULFURIC ACID

(71) Applicant: MacDermid Acumen, Inc., Waterbury, CT (US)

(72) Inventors: Trevor Pearson, West Midlands (GB); Terrence Clark, Wolverhampton (GB); Roshan V. Chapaneri, Coventry (GB); Craig Robinson, Coventry (GB); Alison Hyslop, Birmingham (GB); Amrik Singh, Coventry (GB)

(73) Assignee: MacDermid Acumen, Inc., Waterbury, CT (US)

( * ) Notice: Subject to any disclaimer, the term of this patent is extended or adjusted under 35 U.S.C. 154(b) by 534 days.

(21) Appl. No.: 15/357,385

(22) Filed: Nov. 21, 2016

(65) Prior Publication Data
US 2017/0067176 A1 Mar. 9, 2017

Related U.S. Application Data

(60) Division of application No. 13/795,382, filed on Mar. 12, 2013, now Pat. No. 9,534,306, which is a continuation-in-part of application No. 13/677,798, filed on Nov. 15, 2012, now Pat. No. 9,752,241, which is a continuation-in-part of application No. 13/356,004, filed on Jan. 23, 2012, now Pat. No. 10,260,000.

(51) Int. Cl.
| | |
|---|---|
| C25D 5/34 | (2006.01) |
| C25C 1/10 | (2006.01) |
| C25C 7/00 | (2006.01) |
| C09K 13/04 | (2006.01) |
| C25B 11/12 | (2006.01) |
| C25B 1/21 | (2006.01) |
| C25B 9/06 | (2006.01) |
| C25D 5/56 | (2006.01) |
| C09K 13/06 | (2006.01) |
| C25B 1/00 | (2006.01) |
| C25B 11/04 | (2006.01) |
| C25B 11/14 | (2006.01) |

(52) U.S. Cl.
CPC ........... *C25D 5/34* (2013.01); *C09K 13/04* (2013.01); *C09K 13/06* (2013.01); *C25B 1/21* (2013.01); *C25B 9/06* (2013.01); *C25B 11/12* (2013.01); *C25C 1/10* (2013.01); *C25C 7/00* (2013.01); *C25D 5/56* (2013.01); *C25B 1/00* (2013.01); *C25B 11/0415* (2013.01); *C25B 11/0431* (2013.01); *C25B 11/14* (2013.01)

(58) Field of Classification Search
None
See application file for complete search history.

(56) References Cited

U.S. PATENT DOCUMENTS

| | | | |
|---|---|---|---|
| 3,065,155 A | 11/1962 | Welsh | |
| 3,625,758 A | 12/1971 | Stahl et al. | |
| 3,795,622 A * | 3/1974 | Dutkewych et al. | ........................ C23C 18/2033 252/79.1 |
| 3,941,677 A | 3/1976 | Bourne | |
| 4,042,729 A | 8/1977 | Polichette et al. | |
| 4,170,527 A | 10/1979 | Beer et al. | |
| 4,279,705 A | 7/1981 | Riggs | |
| 4,394,227 A | 7/1983 | Jager et al. | |
| 4,530,745 A | 7/1985 | Komatsu et al. | |
| 4,544,450 A | 10/1985 | Oberrauch | |
| 4,610,895 A | 9/1986 | Tubergen | |
| 4,941,940 A | 7/1990 | Patel et al. | |
| 4,948,630 A | 8/1990 | Courduvelis et al. | |
| 5,015,329 A | 5/1991 | Patel et al. | |
| 5,049,230 A | 9/1991 | Patel | |
| 5,093,033 A * | 3/1992 | Feldhues | .............. C08G 61/126 252/500 |
| 5,160,600 A | 11/1992 | Patel et al. | |
| 5,213,665 A | 5/1993 | Sugishima et al. | |
| 5,229,169 A | 7/1993 | Chao | |
| 5,246,553 A | 9/1993 | Harrison et al. | |
| 5,648,125 A | 7/1997 | Cane | |
| 6,645,557 B2 | 11/2003 | Joshi | |
| 6,861,097 B1 | 3/2005 | Goosey et al. | |
| 9,752,074 B2 | 9/2017 | Schildmann et al. | |

(Continued)

FOREIGN PATENT DOCUMENTS

| | | |
|---|---|---|
| EP | 0890566 | 1/1999 |
| EP | 2025708 A1 | 2/2009 |

(Continued)

OTHER PUBLICATIONS

Comninellis, et al., "Electrochemical Production of Manganic Sulfate in Concentrated H2SO4," Journal of the Electrochemical Socety, Electrochemical Society, vol. 129, No. 4, pp. 749-752, Jan. 1, 1982.

*Primary Examiner* — Roberts P Culbert
(74) *Attorney, Agent, or Firm* — Carmody Torrance Sandak & Hennessey LLP

(57) ABSTRACT

An electrolytic cell and a method of electrochemical oxidation of manganese(II) ions to manganese(III) ions in the electrolytic cell are described. The electrolytic cell comprises (1) an electrolyte solution of manganese(II) ions in a solution of at least one acid; (2) a cathode immersed in the electrolyte solution; and (3) an anode immersed in the electrolyte solution and spaced apart from the cathode. Various anode materials are described including vitreous carbon, reticulated vitreous carbon, woven carbon fibers, lead and lead alloy. Once the electrolyte is oxidized to form a metastable complex of manganese(III) ions, a platable plastic may be contacted with the metastable complex to etch the platable plastic. In addition, a pretreatment step may also be performed on the platable plastic prior to contacting the platable plastic with the metastable complex to condition the plastic surface.

9 Claims, No Drawings

(56) References Cited

U.S. PATENT DOCUMENTS

| | | | |
|---|---|---|---|
| 2003/0024821 | A1 | 2/2003 | Chopra |
| 2004/0074780 | A1 | 4/2004 | Twardowski et al. |
| 2005/0199587 | A1 | 9/2005 | Bengston |
| 2008/0193847 | A1 | 8/2008 | Suetsugu et al. |
| 2009/0092757 | A1 | 4/2009 | Satou et al. |
| 2010/0155255 | A1 | 6/2010 | Nagao et al. |
| 2011/0140035 | A1 | 6/2011 | Schildmann et al. |
| 2011/0189590 | A1 | 8/2011 | Guo |
| 2012/0045680 | A1 | 2/2012 | Dong et al. |

FOREIGN PATENT DOCUMENTS

| | | |
|---|---|---|
| WO | 7900258 A1 | 5/1979 |
| WO | 2006054996 A1 | 5/2006 |
| WO | 2009023628 | 2/2009 |

* cited by examiner

ELECTROLYTIC GENERATION OF MANGANESE (III) IONS IN STRONG SULFURIC ACID

CROSS REFERENCE TO RELATED APPLICATIONS

This application is a divisional of application Ser. No. 13/795,382, filed on Mar. 12, 2013, now pending, which is a continuation-in-part of application Ser. No. 13/677,798, filed on Nov. 15, 2012, now pending, which is a continuation-in-part of application Ser. No. 13/356,004, filed on Jan. 23, 2012, now pending, the subject matter of each of which is herein incorporated by reference in its entirety.

FIELD OF THE INVENTION

The present invention relates generally to an improved process for etching platable plastics such as ABS and ABS/PC.

BACKGROUND OF THE INVENTION

It is well known in the art to plate non-conductive substrates, (i.e. plastics) with metal for a variety of purposes. Plastic moldings are relatively inexpensive to produce and metal plated plastic is used for many applications. For example, metal plated plastics are used for decoration and for the fabrication of electronic devices. An example of a decorative use includes automobile parts such as trim. Examples of electronic uses include printed circuits, wherein metal plated in a selective pattern comprises the conductors of the printed circuit board, and metal plated plastics used for EMI shielding. ABS resins are the most commonly plated plastics for decorative purposes while phenolic and epoxy resins are the most commonly plated plastics for the fabrication of printed circuit boards.

Plating on plastic surfaces is used in the production of a variety of consumer items. Plastic moldings are relatively inexpensive to produce and plated plastic is used for many applications, including automotive trim. There are many stages involved in the plating of plastic. The first stage involves etching the plastic in order to provide mechanical adhesion of the subsequent metallic coatings and to provide a suitable surface for adsorption of the palladium catalyst which is typically applied in order to catalyze deposition of the initial metallic layer from an autocatalytic nickel or copper plating process. Following this, deposits of copper, nickel and/or chromium may be applied.

The initial etching of the plastic components is an essential part of the overall process. However, only certain types of plastic components are suitable for plating. The most common types of plastic for electroplating are acrylonitrile/butadiene/styrene (ABS) or a blend of ABS with polycarbonate (ABS/PC). ABS consists of two phases. The first phase is a relatively hard phase consisting of an acrylonitrile/styrene copolymer and the second phase is a softer polybutadiene phase.

Currently, this material is etched almost exclusively using a mixture of chromic and sulfuric acids, which is highly effective as an etchant for ABS and ABS/PC. The polybutadiene phase of the plastic contains double bonds in the polymer backbone, which are oxidized by the chromic acid, thus causing complete breakdown and dissolution of the polybutadiene phase exposed at the surface of the plastic which gives an effective etch to the surface of the plastic.

One problem with the traditional chromic acid etching step is that chromic acid is a recognized carcinogen and is increasingly regulated, requiring that wherever possible, the use of chromic acid is replaced with safer alternatives. The use of a chromic acid etchant also has well-known and serious drawbacks, including the toxicity of chromium compounds which makes their disposal difficult, chromic acid residues remaining on the polymer surface that inhibit electroless deposition, and the difficulty of rinsing chromic acid residues from the polymer surface following treatment. Additionally, hot hexavalent chromium sulfuric acid solutions are naturally hazardous to workers. Burns and upper respiratory bleeding are common in workers routinely involved with these chrome etch solutions. Thus, it is very desirable that safer alternatives to acidic chromium etching solutions be developed.

Early attempts to replace the use of chromic acid for etching plastics typically focused on the use of permanganate ions as an alternative to chromic acid. The use of permanganate in combination with acid is described in U.S. Pat. No. 4,610,895 to Tubergen et al., which is herein incorporated by reference in its entirety. Later, the use of permanganate in combination with an ionic palladium activation stage was suggested in U.S. Pat. Pub. No. 2005/019957 to Bengston, which is herein incorporated by reference in its entirety. The use of acid permanganate solutions in combination with perhalo ions (e.g., perchlorate or periodate) was described in U.S. Pat. Pub. No. 2009/0092757 to Satou, which is herein incorporated by reference in its entirety. Finally, the use of permanganate ions in the absence of alkali metal or alkaline earth metal cations was described in International Pub. No. WO 2009/023628 to Enthone, which is herein incorporated by reference in its entirety.

Permanganate solutions are also described in U.S. Pat. No. 3,625,758 to Stahl et al., which is herein incorporated by reference in its entirety. Stahl suggests the suitability of either a chrome and sulfuric acid bath or a permanganate solution for preparing the surface. In addition, U.S. Pat. No. 4,948,630 to Courduvelis et al., which is herein incorporated by reference in its entirety, describes a hot alkaline permanganate solution that also contains a material, such as sodium hypochlorite, that has an oxidation potential higher than the oxidation potential of the permanganate solution. U.S. Pat. No. 5,648,125 to Cane, which is herein incorporated by reference in its entirety, describes the use of an alkaline permanganate solution comprising potassium permanganate and sodium hydroxide, wherein the permanganate solution is maintained at an elevated temperature, i.e., between about 165° F. and 200° F.

As is readily seen, many etching solutions have been suggested as a replacement for chromic acid in processes for preparing non-conductive substrates for metallization. However, none of these processes have proven satisfactory for various economic, performance and/or environmental reasons and thus none of these processes have achieved commercial success or been accepted by the industry as a suitable replacement for chromic acid etching. In addition, the stability of these permanganate based etching solutions may also be poor, resulting in the formation of manganese dioxide sludge.

The tendency for permanganate based solutions to form sludge and undergo self-decomposition has been investigated by the inventors here. Under strongly acidic conditions, permanganate ions can react with hydrogen ions to produce manganese (II) ions and water according to the following reaction:

$$4MnO_4^- + 12H^+ \rightarrow 4Mn^{2+} + 6H_2O + 5O_2 \quad (1)$$

The manganese(II) ions formed by this reaction can then undergo further reaction with permanganate ions forming a sludge of manganese dioxide according to the following reaction:

$$2MnO_4^- + 2H_2O + 3Mn^{2+} \rightarrow 5MnO_2 + 4H^+ \quad (2)$$

Thus formulations based on strongly acidic permanganate solutions are intrinsically unstable irrespective of whether the permanganate ion is added by alkali metal salts of permanganate or is electrochemically generated in situ. In comparison to the currently used chromic acid etches, the poor chemical stability of acidic permanganate renders it effectively useless for large scale commercial application. Alkaline permanganate etches are more stable, and are widely used in the printed circuit board industry for etching epoxy based printed circuit boards, but alkaline permanganate is not an effective etchant for plastics such as ABS or ABS/PC. Thus, manganese (VII) is unlikely to gain widespread commercial acceptance as an etchant for these materials.

Attempts to etch ABS without the use of chromic acid have included the use of electrochemically generated silver (II) or cobalt (III). Certain metals can be anodically oxidized to oxidation states which are highly oxidizing. For example, cobalt can be oxidized from cobalt (II) to cobalt (III) and silver can be oxidized from silver (I) to silver (II).

However, there is currently no suitable commercially successful etchant for plastics based on either permanganate (in either acid or alkaline form), or manganese in any other oxidation state or by using other acids or oxidants.

Thus, there remains a need in the art for an improved etchant for preparing plastic substrates for subsequent electroplating that does not contain chromic acid and that is commercially acceptable.

SUMMARY OF THE INVENTION

It is an object of the invention to provide an etchant for plastic substrates that does not contain chromic acid.

It is another object of the present invention to provide an etchant for plastic substrates that is commercially acceptable.

It is another object of the present invention to provide an etchant for plastic substrates that is based on manganese ions.

It is still another object of the present invention to provide an electrode that is suitable for use in a strong acid oxidizing electrolyte but that is not degraded by the electrolyte.

It is still another object of the present invention to provide a suitable electrode for the generation of manganese(III) ions in strong sulfuric acid that is commercially acceptable.

It is still another object of the present invention to provide an improved pretreatment step for conditioning the plastic substrate prior to etching.

In one embodiment, the present invention relates generally to an electrolytic cell comprising:

an electrolyte solution comprising manganese(III) ions in a solution of sulfuric acid and an additional acid selected from the group consisting of methane sulfonic acid, methane disulfonic acid and combinations thereof;

a cathode in contact with the electrolyte solution; and an anode in contact with the electrolyte solution.

In another embodiment, the present invention relates generally to an electrolytic cell comprising:

an electrolyte solution comprising manganese(III) ions in a solution of at least one acid;

a cathode in contact with the electrolyte solution; and an anode in contact with the electrolyte solution, wherein the anode comprises a material selected from the group consisting of vitreous carbon, reticulated vitreous carbon, woven carbon fibers, lead, lead alloy and combinations of one or more of the foregoing.

In another embodiment, the present invention relates generally to a method of preparing a solution capable of etching a plastic substrate, the method comprising the steps of:

providing an electrolyte comprising a solution of manganese(II) ions in a solution of at least one acid in an electrolytic cell, wherein the electrolytic cell comprises an anode and a cathode; and applying a current to the anode and cathode of the electrolytic cell; and oxidizing the electrolyte to form manganese(III) ions, wherein the manganese (III) ions form a metastable complex.

In another embodiment, the present invention relates generally to electrodes that are suitable for the electrochemical oxidation of manganese(II) ions to manganese(III) ions in a strong acid solution.

In another embodiment, the present invention relates generally to a method of electrochemical oxidation of manganese(II) ions to manganese(III) ions comprising the steps of:

providing an electrolyte comprising a solution of manganese(II) ions in a solution of at least one acid, wherein the at least one acid comprises sulfuric acid and an additional acid selected from the group consisting of methane sulfonic acid, methane disulfonic acid and combinations thereof in an electrolytic cell, wherein the electrolytic cell comprises an anode and a cathode;

applying a current between the anode and the cathode; and oxidizing the electrolyte to form manganese(III) ions, wherein the manganese (III) ions form a metastable complex.

In still another embodiment, the present invention relates generally to a method of etching a plastic part, the method comprising contacting the plastic part with a solution comprising manganese(III) ions and at least one acid.

DETAILED DESCRIPTION OF THE PREFERRED EMBODIMENTS

The inventors of the present invention have found that trivalent manganese can readily be produced by electrolysis at low current density of divalent manganese ions in a strong acid solution, preferably a strong sulfuric acid solution, most preferably an at least 8M sulfuric acid solution. More particularly, the inventors of the present invention have discovered that a solution of trivalent manganese ions in a strongly acidic solution is capable of etching ABS.

Trivalent manganese is unstable and is highly oxidizing (standard redox potential of 1.51 versus normal hydrogen electrode). In solution, it very rapidly disproportionates to manganese dioxide and divalent manganese via the following reaction:

$$2Mn^{3+} + 2H_2O \rightarrow MnO_2 + Mn^{2+} + 4H+ \quad (3)$$

However, in a strong sulfuric acid solution, the trivalent manganese ion becomes meta-stable and forms a cherry purple/red colored sulfate complex. The inventors have found that this sulfate complex is a suitable medium for the etching of ABS and has many advantages over chromium-free etches of the prior art.

Thus, in one embodiment, the present invention relates generally to a method of preparing a solution capable of etching a plastic substrate, the method comprising the steps of:

providing an electrolyte comprising a solution of manganese(II) ions in a solution of at least one acid in an electrolytic cell, wherein the electrolytic cell comprises an anode and a cathode; and applying a current to the anode and cathode of the electrolytic cell; and oxidizing the electrolyte to form manganese(III) ions, wherein the manganese (III) ions form a metastable complex.

In a preferred embodiment, the plastic substrate comprises ABS or ABS/PC.

While it is contemplated that both phosphoric acid and sulfuric acid would be suitable for compositions of the present invention, in a preferred embodiment, the acid is sulfuric acid. At ambient temperatures, the half life of the manganese(III) ions in 7M sulfuric acid is on of the order of 2 years. By comparison, the half-life of similar concentrations of manganese(III) ions in 7M phosphoric acid was around 12 days. It is suggested that the much higher stability of the manganese(III) ions in sulfuric acid is due to the formation of mangano-sulfate complexes and the higher concentration of available hydrogen ion concentration in the sulfuric acid solution. A further problem with the use of phosphoric acid is the limited solubility of manganese(III) phosphate. Thus, although other inorganic acids such as phosphoric acid can be usable in the compositions of the present invention, it is generally preferred to use sulfuric acid.

The remarkable stability of manganese(III) ions in strong sulfuric acid provides the following advantages in use:

1) Because the Mn(III) ions are formed at a low current density, the power requirements for the process are typically very low.
2) Because the anode operates at a very low current density, a small cathode in relationship to the anode area can be used to prevent cathodic reduction of the Mn(III) ions. This obviates the need for a divided cell and makes the engineering of an etchant regeneration cell simpler.
3) Because the process does not produce permanganate ions, there is no possibility of producing manganese heptoxide in the solution (this is a considerable safety hazard as it is violently explosive).
4) Because of the high stability of the Mn(III) ions in strong sulfuric acid, the etchant can be sold ready for use. In production, the etchant requires only a small regeneration cell at the side of the tank in order to maintain the Mn(III) content of the etch and prevent the build-up of Mn(II) ions.
5) Because other etch processes are based on permanganate, the result of the reaction of permanganate with Mn(II) ions causes rapid "sludging" with manganese dioxide and a very short lifetime of the etch. This should not be an issue with the Mn(III) based etch (although there may be some disproportionation over time).
6) The electrolytic production of Mn(III) in accordance with the present invention does not produce any toxic gases. While some hydrogen may be produced at the cathode, owing to the low current requirements, this would be less than that produced by many plating processes.

As described herein, in a preferred embodiment the acid is sulfuric acid. The concentration of sulfuric acid is preferably at least 8 molar, more preferably between about 9 and about 15 molar. The concentration of sulfuric acid is important in the process. Below a concentration of about 9 molar, the rate of etch becomes slow and above about 14 molar, the solubility of manganese ions in the solution becomes low. Additionally, very high concentrations of sulfuric acid tend to absorb moisture from the air and are hazardous to handle. Thus, in a most preferred embodiment, the concentration of sulfuric acid is between about 12 and 13 molar, which is dilute enough to allow the safe addition of water to the etch and strong enough to optimize the etch rate of the plastic. At this concentration of sulfuric acid, up to around 0.08M of manganese sulfate can be dissolved at the preferred operating temperature of the etch. For optimal etching, the concentration of manganese ions in solution should be as high as it is feasible to achieve.

The manganese(II) ions are preferably selected from the group consisting of manganese sulfate, manganese carbonate and manganese hydroxide although other similar sources of manganese(II) ions known in the art would also be usable in the practice of the invention. The concentration of manganese(II) ions may be in the range of between about 0.005 molar up to saturation. In one embodiment, the electrolyte also comprises colloidal manganese dioxide. This may form to some extent as a natural result of disproportionation of manganese(III) in solution, or may be added deliberately.

Manganese(III) ions can be conveniently generated by electrochemical means by the oxidation of manganese(II) ions. In addition, it is generally preferable that the electrolyte not contain any permanganate ions.

As described herein, in order to obtain rapid rates of etching on the ABS plastic, it is necessary to use a high concentration of acid. The presence of sulfate or bisulfate ions is necessary to form a complex with the manganese ions and a molar concentration of sulfuric acid of at least 8M is necessary to obtain good stability of the etch. For good etching of plastic, it was found that a concentration of sulfuric acid of at least about 12M is necessary for rapid etching. This has the effect of reducing the solubility of manganese ions in the bath and the maximum solubility of manganese ions in the bath at operating temperature is about 0.08M. Because the etch rate depends on the concentration of manganese (III) ions in solution and the maximum conversion percentage to maintain stability is about 50%, it would be desirable to increase the amount of manganese which can be dissolved in the bath.

The inventors have found that it is possible to increase the amount of manganese that can be dissolved in the bath by replacing a portion of the sulfuric acid with another acid in which the manganese ions may be more soluble.

The choice of acids which may be suitable is limited. For example, hydrochloric acid would produce chlorine at the anodes and nitric acid would produce nitric oxides at the cathode. Perchloric and periodic acids would be expected to generate permanganate ions which would decompose to manganese dioxide. Organic acids would generally be rapidly oxidized by the manganese(III) ions. Thus, acids which would have both the necessary stability to oxidation and the ability to increase the solubility of manganese ions in the bath are methane sulfonic acid and methane disulfonic acid. Since the solubility of manganese(II) is much better in methane sulfonic acid (and sulfuric acid) than it is in methane disulfonic acid, the former choices produce better performance. Thus methane sulfonic acid is the preferred additional acid and sulfuric acid is the preferred primary acid.

Based thereon, the present invention also relates generally to an electrolyte for etching ABS and ABS/PC plastics comprising sulfuric acid in combination with either methane sulfonic acid or methane disulfonic acid in order to obtain better solubility of manganese ions in the bath, wherein the electrolyte contains at least 8M of sulfuric acid and contains about 0M to about 6M of methane sulfonic acid or methane disulfonic acid, preferably from about 1M to about 6M methane sulfonic acid.

More particularly, the present invention relates generally to an electrolytic cell comprising:

an electrolyte solution comprising manganese(III) ions in a solution of sulfuric acid and an additional acid selected from the group consisting of methane sulfonic acid, methane disulfonic acid and combinations thereof;

a cathode in contact with the electrolyte solution; and an anode in contact with the electrolyte solution.

In addition, the present invention also relates generally to an electrolytic cell comprising:

an electrolyte solution comprising manganese(III) ions in a solution of at least one acid;

a cathode in contact with the electrolyte solution; and an anode in contact with the electrolyte solution, wherein the anode comprises a material selected from the group consisting of vitreous carbon, reticulated vitreous carbon, woven carbon fibers, lead, lead alloy and combinations of one or more of the foregoing.

In addition, the present invention also relates generally to a method of electrochemical oxidation of manganese(II) ions to manganese(III) ions comprising the steps of:

providing an electrolyte comprising a solution of manganese(II) ions in at least one acid in an electrolytic cell wherein the electrolytic cell comprises an anode and a cathode;

applying a current between the anode and the cathode; and oxidizing the electrolyte to form manganese(III) ions, wherein the manganese(III) ions form a metastable complex.

Once the electrolyte has been oxidized to form a metastable complex, the platable plastic may be immersed in the metastable complex for a period of time to etch the surface of the platable plastic. In one embodiment, the platable plastic is immersed in the metastable complex a temperature of between 30 and 80° C. The rate of etching increases with temperature and is slow below 50° C.

The upper limit of temperature is determined by the nature of the plastic being etched. ABS begins to distort above 70° C., thus in a preferred embodiment the temperature of the electrolyte is maintained between about 50 and about 70° C., especially when etching ABS materials. The time period of the immersion of the plastic in the electrolyte is preferably between about 10 to about 30 minutes.

Articles etched in this manner may be subsequently electroplated using conventional pretreatment for plated plastics or the etched surface of the plastic may be used to enhance the adhesion of paint, lacquers or other surface coatings.

The concentration of manganese(II) ions used in the etch of this invention can be determined by means of cyclic voltammetry. The oxidation is diffusion controlled so efficient agitation of the etch solution is necessary during the electrolytic oxidation process.

The anode and cathode usable in the electrolytic cell described herein may comprise various materials. The cathode may comprise a material selected from the group consisting of platinum, platinized titanium, niobium, iridium oxide coated titanium, and lead. In one preferred embodiment, the cathode comprises platinum or platinized titanium. In another preferred embodiment, the cathode comprises lead. The anode may also comprise platinized titanium, platinum, iridium/tantalum oxide, niobium, boron doped diamond, or any other suitable material.

The inventors discovered that while the combination of manganese(III) ions and strong sulfuric acid (i.e., 8-15 molar) can etch ABS plastic, the etchant is also very aggressive towards the electrodes necessary to produce the manganese(III) ions. In particular, anodes having a titanium substrate may be rapidly degraded by the etchant.

Therefore, in an attempt to determine a more suitable electrode material, various other electrode materials were examined, including lead and graphite. Vitreous carbon and reticulated vitreous carbon were determined to be more robust and were capable of producing manganese(III) ions when an electrical current, preferably of between 0.1 and 0.4 A/dm$^2$ (based on the nominal surface area), was applied. In addition, because vitreous carbon and reticulated vitreous carbon may not be cost-effective for use as the electrode in commercial applications, the anode may also be manufactured from woven carbon fiber.

Carbon fiber is manufactured from fibers of polyacrylonitrile (PAN). These fibers go through a process of oxidation at increasing temperatures followed by a carbonization step at a very higher temperature in an inert atmosphere. The carbon fibers are then woven into a sheet which is typically used in combination with various resin systems to produce high strength components. Carbon fiber sheets also have good electrical conductivity and the fibers typically have a turbostratic (i.e., disordered layer) structure. Without wishing to be bound by theory, it is believed that it is this structure which makes the carbon fibers effective as an electrode. The $SP^2$ hybridized carbon atoms in the lattice give good electrical conductivity while the $SP^3$ hybridized carbon atoms link the graphitic layers together, locking them in place and thus providing good chemical resistance.

A preferred material for use in the electrodes of the invention comprises a woven carbon fiber containing at least 95% carbon and not impregnated with any resin. In order to facilitate the handling and the weaving process, carbon fibers are typically sized with an epoxy resin and this may comprise up to 2% of the fiber weight. At this low percentage, when used as an electrode, the epoxy sizing is rapidly removed by the high sulfuric acid content of the etch. This may cause an initial slight discoloration of the etch, but does not affect the performance. Following this initial "running in" stage, the anode appears to be resistant to the electrolyte and is effective at oxidizing manganese (II) ions to manganese(III).

Anodes can be constructed by mounting the woven carbon fiber material in a suitable frame with a provision made for electrical contact. It is also possible to use carbon fiber as a cathode in the generation of manganese(III) ions, but it is more convenient to use lead, particularly as the cathode is much smaller than the anode if an undivided cell is used.

The current density which can be applied in the electrolytic cell is limited in part by the oxygen overpotential on the anode material chosen. As an example, in the case of platinized titanium anodes, above a current density of approximately 0.4 A/dm$^2$, the potential of the anode is sufficiently high to liberate oxygen. At this point, the conversion efficiency of manganese(II) ions to manganese(III) ions falls and thus any further increase in current density is wasted. Furthermore, operating the anodes at the higher overpotential required to produce the higher current density tends to produce manganese dioxide at the anode surface rather than manganese(III) ions.

It was surprisingly discovered that lead anodes can be effectively used in the electrolytic cell described herein. Lead becomes passive in strong sulfuric acid due to the formation of a layer of lead sulfate on the surface which has very limited solubility in sulfuric acid. This renders the anode passive until a very high overpotential (More than 2V versus a standard hydrogen electrode) is reached. At potentials above this level, a mixture of oxygen and lead dioxide is produced. While, it would be expected that such a high operating potential would favor oxygen production and the formation of permanganate ions instead of manganese(III) ions, experiments using a lead anode produced only manganese(III) ions and no permanganate. This can be verified by diluting the etch with water—the manganese(II) ions disproportionate producing brown manganese dioxide and manganese(II) ions. Filtration of the solution produces a virtually colorless solution characteristic of manganese(II) ions rather than the purple color of permanganate ions.

The inventors of the present invention have discovered that monitoring the rate of oxidation is necessary when lead anodes are used because of the very high efficiency of these anodes for the oxidation of manganese(II) ions. Thus, if the rate of oxidation is not monitored and controlled, too high a proportion of the manganese(II) ions are oxidized, leaving a very low concentration of manganese(II). In the absence of manganese (II) ions, the anode begins to oxidize manganese (III) ions to manganese(IV), which rapidly forms insoluble manganese dioxide.

Based thereon, it is important that no more than 50%, and preferably no more than 25%, of the original concentration of manganese(II) ions be oxidized to manganese(III) ions in order to maintain the stability of the electrolyte. In the case of lead anodes, this involves monitoring the build-up of manganese(III) ions by titration of the etch solution or using a redox electrode and stopping the electrolysis when the manganese (III) content reaches the desired level. At a concentration of sulfuric acid of 12.5M, it is necessary to have a concentration of more than 0.01M of manganese(III) ions for effective etching and maximum stability, and no more than 0.04M based on a total manganese content of 0.08M.

The anodes may comprise lead or a suitable lead alloy, and the type of alloy chosen can affect the efficiency of conversion. Pure lead or lead containing a small percentage of tin are particularly effective and produce conversion efficiencies of approximately 70%. It was also discovered that with a reasonable degree of agitation, surprisingly high current densities can be applied and still maintain this conversion rate.

Upon prolonged electrolysis using a lead anode, it was observed that a film of manganese dioxide eventually formed. Once a significant amount of manganese dioxide has nucleated on the electrode surface, it tends to grow thicker quite quickly. However, manganese dioxide is readily reduced electrochemically back to manganese(II) ions. Thus, the accumulation of manganese dioxide can be mitigated or eliminated by the process of reversing the cell current periodically. The time period between current reversals is not critical as long as sufficient coulombic charge is applied during the reversal phase to reduce the amount of manganese dioxide which has deposited on the surface back to manganese(II) ions.

Based thereon, when using lead and lead alloy electrodes for the purpose of generating manganese(III) ions in sulfuric acid solutions for the purpose of etching ABS or ABS/PC, the electrolysis process is preferably interrupted when the manganese(III) ions have reached a suitable working concentration which may be between 0.01 and 0.04M based on a total manganese content of 0.08M, such that there remains in solution an effective amount of manganese(II) ions such that the bath is stable and does not precipitate excessive amounts of manganese dioxide. Preferred electrode materials include, for example, pure lead, lead antimony containing about 4% antimony, lead tin anodes containing up to 5% tin and lead/tin/calcium anodes. Other suitable lead alloys may also be used in the practice of the invention. In addition, the use of periodically reversed current prevents the build-up of manganese dioxide films on the anode. This is useful to maintain the conversion efficiency of the anodes and reduce or obviate the need to remove and clean the anodes from the etch tank or regeneration cell.

In addition, for efficient generation of manganese(III) ions, it is generally necessary to use an anode area which is large in comparison to the area of the cathode. Preferably, the area ratio of anode to cathode is at least about 10:1. By this means, the cathode can be immersed directly in the electrolyte and it is not necessary to have a divided cell. Although the process would work with a divided cell arrangement, this would introduce unnecessary complexity and expense.

The invention will now be illustrated with reference to the following non-limiting examples:

Comparative Example 1

A solution of 0.08 molar of manganese(II) sulfate in 12.5 molar sulfuric acid (500 ml) was heated to 70° C. and a piece of platable grade ABS was immersed in the solution. Even after an hour immersed in this solution, there was no discernible etching of the test panel and upon rinsing, the surface was not "wetted" and would not support an unbroken film of water.

Example 1

The solution of Comparative Example 1 was electrolyzed by immersing a platinized titanium anode of an area of 1 $dm^2$ and a platinized titanium cathode of surface area 0.01 $dm^2$ in the solution and applying a current of 200 mA for 5 hours.

During this period of electrolysis, the solution was observed to change in color from almost colorless to a very deep purple/red color. It was confirmed that no permanganate ions were present.

This solution was then heated to 70° C. and a piece of platable grade ABS was immersed in the solution. After 10 minutes of immersion, the test piece was fully wetted and would support an unbroken film of water after rinsing. After 20 minutes of immersion, the sample was rinsed in water, dried and examined using a scanning electron microscope (SEM). This examination revealed that the test piece was substantially etched and many etch pits were visible.

Example 2

A solution containing 12.5M of sulfuric acid and 0.08M manganese(II) sulfate was electrolyzed using a platinized titanium anode at a current density of 0.2 A/dm$^2$. A platinized titanium cathode having an area of less than 1% of the anode area was used in order to prevent cathodic reduction of the Mn(III) ions produced at the anode. The electrolysis was performed for long enough for sufficient coulombs to be passed to oxidize all of the manganese(II) ions to manganese (II). The resulting solution was a deep cherry purple/red color. There were no permanganate ions generated during this step. This was also confirmed by visible spectroscopy—the Mn(III) ions produced a completely different absorption spectrum from that of a solution of permanganate.

Example 3

The etching solution prepared as described above in Example 2 was heated to 65-70° C. on a magnetic stirrer/hotplate and test coupons of ABS were immersed in the solution for time periods of 20 and 30 minutes. Some of these test coupons were examined by SEM and some were processed in a normal plating on plastic pretreatment sequence (reduction in M-neutralize, predip, activate, accelerate, electroless nickel, copper plate to 25-30 microns). These test coupons were then annealed and subjected to peel strength testing using an Instron machine.

Peel strength testing carried out on coupons plated for 30 minutes demonstrated peel strength varying between about 1.5 and 4 N/cm.

Cyclic voltammograms were obtained from a solution containing 12.5M sulfuric acid and 0.08M manganese sulfate using a platinum rotating disk electrode (RDE) having a surface area of 0.196 cm$^2$ at various rotation speeds. A model 263A potentiostat and a silver/silver chloride reference electrode were used in conjunction with the RDE.

In all cases, the forward scan showed a peak at around 1.6V vs. Ag/AgCl followed by a plateau up to around 1.75V followed by an increase in current. The reverse scan produced a similar plateau (at a slightly lower current and a peak around 1.52V. The dependence of these results on the rate of electrode rotation indicates mass transport control is a primary factor in the mechanism. The plateau indicates the potential range over which Mn(III) ions are formed by electrochemical oxidation.

A potentiostatic scan was performed at 1.7V. It was observed that the current initially dropped and then over a period of time increased. The current density at this potential varied between 0.15 and 0.4 A/dm$^2$.

Following this experiment, a galvanostatic measurement was taken at a constant current density of 0.3 A/dm$^2$. Initially, the applied current density was achieved by a potential of about 1.5V but as the experiment progressed, after about 2400 seconds, and increase in potential to about 1.75V was observed.

After a period of etching for more than 10 minutes, it was observed that the surface of the ABS test coupons was fully wetted and would support an unbroken film of water after rinsing. After a period of 20 or 30 minutes, the panels were noticeably etched.

Example 4

A solution was formulated comprising 10.5M sulfuric acid and 2M methane sulfonic acid. At a temperature of 68-70° C., it was possible to dissolve 0.16M of manganous sulfate with ease, whereas in the comparative case of dissolving manganese sulfate in a solution of 12.5M sulfuric acid, it was only possible to dissolve 0.08M. The formulated solution was electrolyzed to produce a manganese(III) concentration of 0.015M manganese(III) ions, which gave a comparable etch rate to that obtained from a solution of 12.5M sulfuric acid having a manganese(III) concentration of 0.015M.

Electrolysis was continued in the bath of Example 4 until the manganese(III) content reached 0.04M and another panel was etched. An enhanced etch rate was obtained at this higher concentration of manganese(III) ions (approximately 25% higher than that obtained at a concentration of 0.015M).

Comparative Example 2

An electrode comprising graphite and having a nominal measured surface area of 1 dm$^2$ was immersed in 500 mL of a solution containing 0.08M of manganese sulfate in 12.5M sulfuric acid at a temperature of 65° C. The cathode in this cell was a piece of lead having a nominal measured surface area of 0.1 dm$^2$. A current of 0.25 amps was applied to the cell, giving a nominal anode current density of 0.25 A/dm$^2$ and a nominal cathode current density of 2.5 A/dm$^2$.

It was observed that the graphite anode rapidly crumbled and degraded within less than 1 hour of electrolysis. In addition, no oxidation of manganese(II) ions to manganese (II) was observed.

Comparative Example 3

An electrode comprising a titanium substrate coating with a mixed tantalum/iridium oxide coating (50% tantalum oxide, 50% iridium oxide) and having a nominal measured surface area of 1 dm$^2$ was immersed in 500 mL of a solution containing 0.08M of manganese sulfate in 12.5M sulfuric acid at a temperature of 65° C. The cathode in this cell was a piece of lead having a nominal measured surface are of 0.1 dm$^2$. A current of 0.25 amps was applied to the cell giving a nominal anode current density of 0.25 A/dm$^2$ and a nominal cathode current density of 2.5 A/dm$^2$.

It was observed that manganese(III) was rapidly formed in the solution and the resulting solution was capable of etching ABS plastic and producing good adhesion upon subsequent electroplating of the treated plastic. However, after a period of two weeks operation (electrolyzing the solution for 8 hours/day), it was observed that the coating was lifting from the titanium substrate and that the titanium substrate itself was dissolving in the solution.

Comparative Example 4

An electrode comprising a titanium substrate coated with platinum and having a nominal measured surface area of 1 dm$^2$ was immersed in 500 mL of a solution containing 0.08M of manganese sulfate in 12.5M sulfuric acid at a temperature of 65° C. The cathode in this cell was a piece of lead having a nominal measured surface area of 0.1 dm$^2$. A current of 0.25 amps was applied to the cell giving a nominal anode current density of 0.25 A/dm$^2$ and a nominal cathode current density of 2.5 A/dm$^2$.

It was observed that manganese(III) was rapidly formed in the solution and the resulting solution was capable of etching ABS plastic and producing good adhesion upon subsequent electroplating of the treated plastic. However, after a period of two weeks operation (electrolyzing the solution for 8 hours/day), it was observed that the coating was lifting from the titanium substrate and that the titanium substrate itself was dissolving in the solution.

Example 5

An electrode comprising vitreous carbon and having a nominal measured surface area of 0.125 dm2 was immersed in 100 mL of a solution containing 0.08M of manganese sulfate in 12.5M sulfuric acid at a temperature of 65° C. The cathode in this cell was a piece of platinum wire having a nominal measured surface area of 0.0125 dm$^2$. A current of 0.031 amps was applied to the cell giving a nominal anode current density of 0.25 A/dm$^2$ and a nominal cathode current density of 2.5 A/dm$^2$.

It was observed that manganese(III) was rapidly formed in the solution and the resulting solution was capable of etching ABS plastic and producing good adhesion upon subsequently electroplating the treated plastic. The electrode appeared unaffected by periods of extended electrolysis.

Example 6

An electrode comprising a piece of woven carbon fiber (Panex 35 50K Tow with epoxy sizing at 1.5%, available from the Zoltek Corporation) was mounted in a plastic frame constructed of polyvinylidenefluoride (PVDF). The electrode, having a nominal measured area of 1 dm$^2$, was immersed in 500 mL of a solution containing 0.08M of manganese sulfate in 12.5M sulfuric acid at a temperature of 65° C. The cathode in this cell was a piece of lead having a nominal measured surface area of 0.1 dm$^2$. A current of 0.25 amps was applied to the cell, giving a nominal anode current density of 0.25 A/dm$^2$ and a nominal cathode current density of 2.5 A/dm$^2$.

It was observed that manganese(III) was rapidly formed in the solution and the resulting solution was capable of etching ABS plastic and producing good adhesion upon subsequent electroplating of the treated plastic. The electrode appeared unaffected by periods of extended electrolysis. Electrolysis was carried out over two weeks using this electrode and no observable degradation could be detected. The low cost and ready availability of this material makes it suitable for many commercial applications.

Example 7

An anode consisting of lead having an effective surface area (i.e., not counting the back of the electrode) of 0.4 dm$^2$ was immersed in a beaker containing 2 liters of a solution comprising 0.08M of manganese sulfate in 12.5M sulfuric acid at a temperature of 68-70° C. The other electrode in the cell consisted of a lead cathode having a surface area of approximately 0.04 dm$^2$. The solution was stirred using a magnetic stirrer to obtain moderate agitation over the surface of the electrolyte. A current density of 0.4 A/dm$^2$ was applied to the anode and the rate of manganese(III) was determined versus electrolysis time. The amount of manganese(III) was determined by diluting a sample of the bath with phosphoric acid to prevent disproportionation of the manganese(III) and titrating with a solution of ferrous ammonium sulfate using diphenylamine dissolved in acid as an indicator.

The experiment was repeated using a current density of 0.8 A/dm$^2$ and 1.6 A/dm$^2$. Under the hydrodynamic conditions of the experiment (i.e., moderate agitation using a magnetic stirrer), the oxidation did not appear to be mass transport limited at a current density of 1.6 A/dm$^2$ as the conversion efficiency was the same as that obtained at 0.4 A/dm$^2$ (70%). A further experiment was conducted at 3.2 A/dm$^2$ and it was found that the conversion efficiency had fallen to 42% and the rate of manganese(III) generation was only about 10% higher than that obtained at 1.6 A/dm$^2$. This indicates that under the agitation conditions used in the experiment, the overall limiting current density for manganese generation was about 1.6 A/dm$^2$. This corresponds to a conversion rate approximately four times higher than that which can be achieved from a platinized titanium anode.

The results of these experiments demonstrate that manganese(III) ions can be generated by electrosynthesis using manganese(II) ions in sulfuric acid at a relatively high concentration and operating at low current densities using a platinum or platinized titanium anode and that further improvements to the process can be realized by using various other anode materials, including vitreous carbon, carbon fiber, lead and lead alloy anodes.

Furthermore, the slower etch rate of the manganese based etch of the invention as compared with the etch rate obtained from a chromic acid etch has demonstrated a need to provide a pretreatment step to produce higher adhesion values and enable shorter etch times.

The aim of the pretreatment step is to condition the surface of the plastic to be etched so that it is etched more rapidly and evenly, leading to shorter etch times and better adhesion.

The use of solvents to condition the surface of ABS plastics is known. However, recent regulations strictly limit the viability of using volatile solvents on a plating line as they are often flammable and have health and safety issues (many are reprotoxic and may also cause liver damage). Thus, the choice of solvents is limited.

Propylene carbonate is a relatively safe solvent having good water solubility, low toxicity and low flammability (flash point is 135° C.) and is ideal from a health and safety point of view. Gamma butyrolactone also works but is more toxic and in some countries is a controlled drug due to its recreational use.

In the present invention it was discovered that better results may be obtained in combination with the manganese based etch solutions described herein when the use of propylene carbonate is combined with an organic hydroxy acid such as lactic acid, glycolic acid or gluconic acid. The use of propylene carbonate on its own or with a wetting agent gives good adhesion and reduced etch times, but the cosmetic appearance of ABS/PC blends is poor after etching, activation and subsequent plating because it is prone to pitting. The combination of propylene carbonate with these hydroxy acids in the pretreatment stage is effective in preventing this problem.

Typically, the concentration of propylene carbonate is between about 100 and about 500 mL/L and the concentration of the organic acid is between about 100 and about 500 mL/L. In addition, the operating temperature is typically between about 20° and 70° C. and the immersion time is between about 2 and about 10 minutes.

Thus, the present invention also relates generally to a pretreatment composition for the platable plastic substrate comprising Gamma butyrolactone or propylene carbonate in combination with an organic hydroxy acid such as lactic acid, glycolic acid or gluconic acid.

Comparative Example 5

A test coupon composed of an ABS/PC blend consisting of 45% polycarbonate was immersed in a solution containing 150 mL/L of propylene carbonates for the times and temperature shown in Table 1. Following this, the panel was rinsed and etched in a solution containing 12.5M sulfuric acid and 0.08M manganese, where 0.015M of the manganese ions had been electrolytically oxidized to manganese (III). The etching was carried out for 30 minutes at a temperature of 68-70° C. Following this treatment, the panel was rinsed, activated using a standard plating on plastics pretreatment sequence (MacDermid D34 palladium activator, MacDermid accelerator and MacDermid J64 electroless nickel in accordance with the technical data sheets) and then electroplated in copper. The cosmetic appearance of the panels was examined and a quantitative adhesion test was performed by pulling off the deposit from the substrate using an Instron tensile testing machine. The adhesion values obtained are shown in Table 1.

TABLE 1

Adhesion values

| | Adhesion (N/cm) | | |
|---|---|---|---|
| | Side 1 | Side 2 | Average |
| 10 minutes, 40° C. | 8.46 | 9.23 | 8.85 |
| 5 minutes, 40° C. | 4.78 | 5.19 | 4.99 |
| 10 minutes, 70° C. | 5.79 | 5.02 | 5.41 |
| 5 minutes, 70° C. | 11.54 | 8.77 | 10.16 |

The adhesion values are quite variable and it was noted that spots and pitting were observed on the plated parts. The copper coating was also pitted.

Example 8

The experiments performed in Comparative Example 5 were repeated but using a pre-conditioner comprising 150 mL/L of propylene carbonate and 250 mL/L of 88% lactic acid solution. These results of these tests are shown in Table 2.

TABLE 2

Adhesion values

| | Adhesion (N/cm) | | |
|---|---|---|---|
| | Side 1 | Side 2 | Average |
| 10 minutes, 40° C. | 9.75 | 7.55 | 8.65 |
| 5 minutes, 40° C. | 9.84 | — | 9.84 |
| 10 minutes, 70° C. | 9.32 | 9.61 | 9.47 |
| 5 minutes, 70° C. | 9.17 | 10.03 | 9.60 |

Using this preconditioner, which included the lactic acid, gave improvements in the consistency of adhesion. After plating, it was noted that the cosmetic appearance was excellent, being free of spots and pitting.

What is claimed is:

1. A method of etching a plastic part, the method comprising contacting the plastic part with a solution comprising manganese(III) ions and at least one acid,
   wherein the solution is at least substantially free of permanganate; and
   wherein prior to contacting the plastic part with the solution comprising manganese(III) ions and the at least one acid, the plastic part is contacted with a pretreatment composition to condition the surface of the plastic part, the pretreatment composition comprising an organic hydroxy acid and a solvent selected from the group consisting of propylene carbonate, gamma butyrolactone, and combinations thereof.

2. The method according to claim 1 wherein the at least one acid comprises sulfuric acid.

3. The method according to claim 2, wherein the at least one acid further comprises methane sulfonic acid or methane disulfonic acid.

4. The method according to claim 3, wherein the solution of acid comprises at least 8M sulfuric acid and between about 1M and about 6M methane sulfonic acid.

5. The method according to claim 1, wherein the plastic part comprises acrylonitrile/butadiene/styrene.

6. The method according to claim 3, wherein the manganese(III) ions are generated in the solution by electrolytic oxidation of manganese(II).

7. The method according to claim 6 wherein the electrolytic oxidation occurs at an anode in the solution and said anode comprises vitreous carbon, reticulated vitreous carbon, woven carbon fiber, lead or lead alloy.

8. The method according to claim 1, wherein the organic hydroxy acid is selected from the group consisting of lactic acid, glycolic acid, gluconic acid and combinations of one or more of the foregoing.

9. The method according to claim 8, wherein the pretreatment composition comprises about 100 to 500 mL/L of propylene carbonate and about 100 to 500 mL/L of the organic hydroxy acid.

\* \* \* \* \*